United States Patent [19]

Knight

[11] 4,177,383

[45] Dec. 4, 1979

[54] APPARATUS FOR TREATING A SHEET MATERIAL WITH RADIATION

[75] Inventor: Ronald E. Knight, Slough, England

[73] Assignee: Wallace Knight Limited, Slough, England

[21] Appl. No.: 902,690

[22] Filed: May 4, 1978

[51] Int. Cl.² .......................... G01J 1/00; A61K 27/02
[52] U.S. Cl. .................................. 250/492 R; 250/341; 250/504
[58] Field of Search .................... 250/504, 341, 492 R

[56] References Cited

U.S. PATENT DOCUMENTS

| 3,790,801 | 2/1974 | Coleman | 250/492 |
| 3,826,014 | 7/1974 | Helding | 250/504 |
| 3,831,289 | 8/1974 | Knight | 250/504 |
| 3,983,039 | 9/1976 | Eastland | 250/504 |

Primary Examiner—Harold A. Dixon
Attorney, Agent, or Firm—Hopgood, Calimafde, Kalil, Blaustein & Lieberman

[57] ABSTRACT

Apparatus for treating a sheet material with radiation comprises a lamp assembly and gripper means for moving the sheet material along a path past the lamp assembly. The gripper means has a portion which overlies a part of the surface to be treated and the lamp assembly is adapted to produce a beam of radiation having a main focus substantially on the path. The beam is angled relative to the path so that a substantial portion of the overlain surface part is exposed to focused radiation as the sheet material is moved along the path.

7 Claims, 5 Drawing Figures

APPARATUS FOR TREATING A SHEET MATERIAL WITH RADIATION

BACKGROUND OF INVENTION

This invention relates to apparatus for treating a sheet material with radiation which is particularly, although not exclusively, suitable for drying printing ink, varnishes or other similar coatings, or for curing such coatings.

Radiant lamps have become increasingly widely used in the printing industry for drying or curing inks or varnishes on sheet material. Such sheet material is frequently drawn by a tubular gripper mechanism, one sheet at a time, beneath an ultra-violet lamp. The usual relationship between the gripper mechanism and the shape and position of the reflector used in the lamp has resulted in a shadow of the gripper mechanism being cast at the edge of the sheet material. Thus ink or varnish in this region will either not be dried or cured or will only be partially dried or cured.

One solution to this problem has been to leave the leading edge of each sheet blank. This has resulted in wastage and makes the printing process more expensive.

SUMMARY OF INVENTION

According to the present invention there is provided apparatus for treating a sheet material with radiation comprising a lamp assembly, gripper means for moving the sheet material along a path past the lamp assembly, the gripper means having a portion which overlies a part of the surface to be treated and the lamp assembly being adapted to produce a beam of radiation having a main focus substantially on said path, the beam being so angled relative to said path that a substantial portion of said overlain surface part is exposed to focused radiation as the sheet material is moved along the path.

Preferably the lamp assembly includes a reflector situated so as to provide a main focus for the beam of radiation on said path. The reflector is preferably elliptical.

The reflector may be formed from a plurality of sections which are movable between an open fully reflecting position and a closed position. Actuating means may be provided to move the sections to the closed position when the rate at which the sheet material moves along the path past the lamp assembly falls below a predetermined value.

The apparatus may include shutter means movable to prevent the beam of radiation being projected from the lamp assembly.

The apparatus may comprise a pair of lamp assemblies and pivotally mounted shutter means movable between an open position in which both lamp assemblies are in an open beam projecting mode and a closed position in which each lamp assembly is at least partially closed.

Specific embodiments of the present invention will now be described, by way of example, with reference to the accompanying drawings in which:

DETAILED DESCRIPTION OF INVENTION

Figure 1:
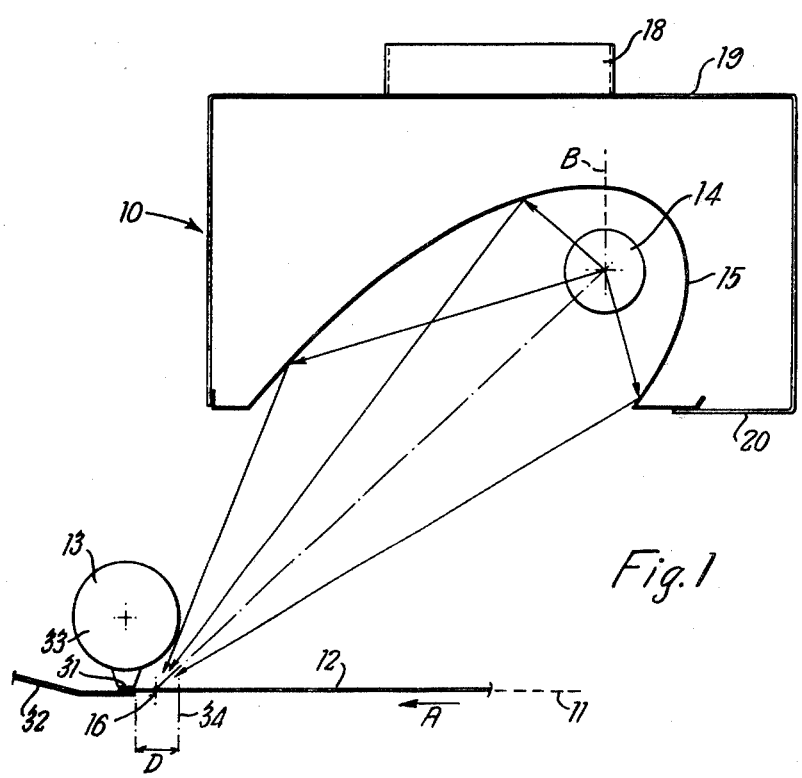
FIG. 1 shows schematically a cross-section of apparatus for treating a sheet material with radiation comprising an ink or varnish drying lamp housing, sheet material to be moved past the lamp and a gripper mechanism for moving the sheet material.

The apparatus shown in FIG. 1 comprises a substantially open-bottomed elongate lamp housing 10 arranged over a path 11 (FIG. 1) along which printed sheet material 12 is moved in the direction of the arrow A by means of a gripper mechanism 13 transported on an endless chain (not shown). The gripper mechanism comprises a friction pad 31 mounted on a tube or bar 33 and an arm 32 which is biassed towards the pad so as to grip the sheet material. When the gripper mechanism is approaching a sheet material 12 the pad 31 and arm 32 are urged apart by a cam arrangement and close on the front edge of the sheet material to grip it and draw it beneath the lamp housing 10 along the path 11. In passing beneath a mercury vapour tube 14 in the housing 10, wet ink or varnish on the sheet material will be dried or cured by the ultra-violet light emitted by the tube 14. The tube 14 is partly surrounded by an elongate reflector 15 which is substantially elliptical when seen in cross-section and which directs rays from the lamp downwardly onto the path 11.

Figure 2:
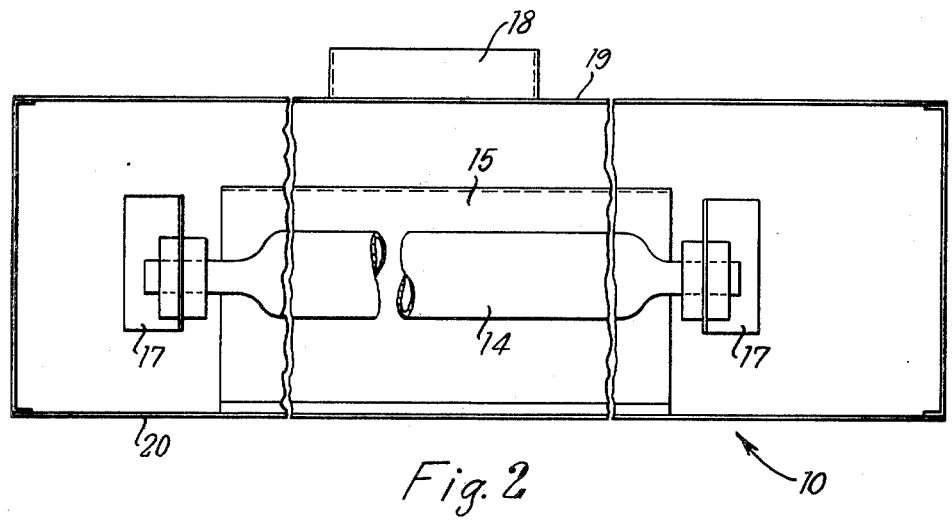
FIG. 2 shows a longitudinal section of the lamp housing of FIG. 1.

The tube 14 is supported by brackets 17 (FIG. 2) within the housing 10 which is also provided with an outlet 18 in its top wall 19 for connection to a fan to enable cooling air to be drawn upwardly through openings (not shown) in the bottom wall 20 of the housing.

The gripper mechanism 13 draws sheets 12, one at a time, beneath the lamp along the path 11. The substantially elliptical shape of the reflector 15 enables ultra-violet light from the tube 14 to be focused on a line 16 transverse to the plane of the drawing and spaced from a plane B passing through the longitudinal axis of the lamp tube 14. The line 16 is between a plane 34 at right angles to the path 11 and the gripper mechanism so that even ink or varnish on the sheet material in this position, which is overshadowed by the gripper mechanism, will be dried or cured by the ultra-violet light and no, or substantially no shadow will be formed in the area D.

The reflector 15 is not a true ellipse since this would give too long a focal length. A compromise has been found which meets the geometrical requirements of the housing but which still focuses substantially all of the light at a line.

Figure 3:
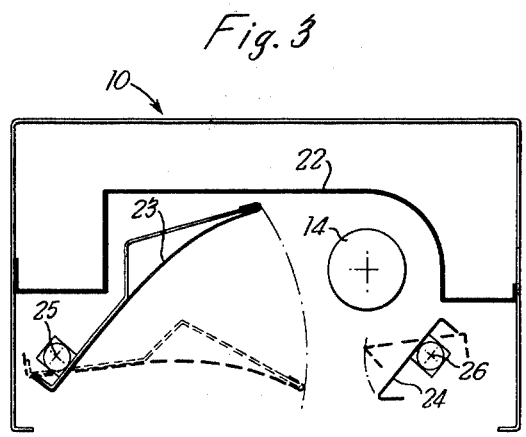
FIGS. 3, 4 and 5 show schematically modified lamp housings for use in the apparatus illustrated in FIG. 1.

FIG. 3 shows a modification of the lamp housing. Here the reflector is formed in three portions; a central, stationary portion 22 and two pivotable side portions 23 and 24. The sections 23 and 24 are adapted to pivot about points 25 and 26 respectively. When the reflector sections 23 and 24 are in the operative positions shown in solid lines, the three sections of the reflector approximate to the ellipse shown in FIG. 1. When the reflector sections 23 and 24 are pivoted to the position shown in chain lines this breaks up the elliptical shape of the reflector and also forms a barrier between the sheet material 12 and the tube 14. The reflector sections can be moved by means of a mechanical linkage through solenoids, air cylinders or other pneumatic or mechanical means. The side portions 23 and 24 may have their rear surfaces formed of or coated with a heat-absorbent, non-reflective material. The arrangement is such that the side portions 23 and 24 are automatically moved to their inoperative positions when the speed of movement of the sheet material 12 falls below a predetermined value.

Figure 4:
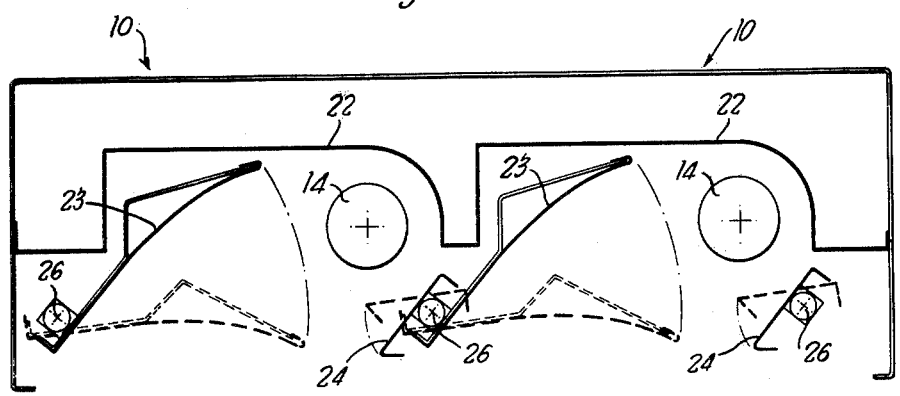

It is sometimes desirable to draw the sheet material past several lamp housings, in which case two or more lamp housings of the type shown in FIG. 3 are arranged adjacent one another, as shown in FIG. 4. The side portions 23, 24 of adjacent lamp housings 10 are adapted to pivot about a common point 26 so that as the side portion 23 of one lamp housing tilts downwards the side portion 24 of the adjacent lamp housing tilts upwards at the same time about the same pivot point 26.

Figure 5:
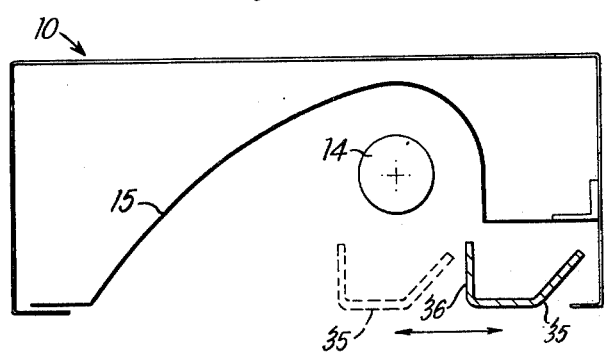

FIG. 5 shows another modification of the lamp housing. Here the lamp housing is provided with a channel-shaped shutter 35, the vertical face 36 of which forms a part of the reflector 15. The shutter 30 is slidable across the open bottom of the lamp housing 10, as shown in chain lines, to form a barrier between the tube 14 and the sheet material 12.

The shutter 35 can be moved by means of a mechanical linkage through solenoids, air cylinders or other pneumatic or mechanical means. The arrangement is such that the shutter 35 is moved to form a barrier between the tube 14 and the sheet material 12 when the speed of movement of the sheet 12 falls below a predetermined value.

What I claim is:

1. Apparatus for treating the surface of a sheet material with radiation comprising a lamp assembly, gripper means for pulling the sheet material by a leading margin along a path past the lamp assembly, the gripper means having a portion which is located on the same side of said path as said lamp assembly and which overlies a part of the surface to be treated and the lamp assembly being adapted to produce a beam of radiation having a main focus substantially on said path, the beam being generally downstream-directed and slanted at an acute angle relative to said path so that a substantial portion of said overlain surface part is exposed to focused radiation as the sheet material is moved along the path.

2. Apparatus for treating the surface of a sheet material with radiation as claimed in claim 1 in which the lamp assembly includes a reflector situated so as to provide a main focus for the beam of radiation on said path.

3. Apparatus for treating the surface of a sheet material with radiation as claimed in claim 2 in which the reflector is substantially elliptical.

4. Apparatus for treating the surface of a sheet material with radiation as claimed in claim 2 in which the reflector is formed from a plurality of sections which are movable between an open fully reflecting and a closed position.

5. Apparatus for treating the surface of a sheet material with radiation as claimed in claim 4 including actuating means for moving the sections to the closed position when the rate at which the sheet material moves along the path past the lamp assembly falls below a predetermined value.

6. Apparatus for treating the surface of a sheet material with radiation as claimed in claim 1 including shutter means movable to prevent the beam of radiation being projected from the lamp assembly.

7. Apparatus for treating the surface of a sheet material with radiation as claimed in claim 1 comprising a pair of lamp assemblies and pivotally mounted shutter means movably between an open position in which both lamp assemblies are in an open beam projecting mode and a closed position in which each lamp assembly at least partially closed.

* * * * *